(12) United States Patent
Hsu et al.

(10) Patent No.: US 6,515,259 B1
(45) Date of Patent: Feb. 4, 2003

(54) ELECTRIC ARC WELDER USING HIGH FREQUENCY PULSES

(75) Inventors: Christopher Hsu, Mentor, OH (US); Bruce E. Fulmer, Mentor, OH (US); Steven R. Peters, Huntsburg, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 63 days.

(21) Appl. No.: 09/866,358

(22) Filed: May 29, 2001

(51) Int. Cl.[7] .............................................. B23K 9/09
(52) U.S. Cl. .......................... 219/130.51; 219/130.31; 219/130.5; 219/137 PS
(58) Field of Search .................. 219/130.51, 130.21, 219/130.31, 130.32, 130.33, 137 PS, 137.71, 130.5

(56) References Cited

U.S. PATENT DOCUMENTS

| | | | | |
|---|---|---|---|---|
| 3,956,610 A | * | 5/1976 | Kanbe et al. | 219/130.51 |
| 4,758,707 A | * | 7/1988 | Ogilvie et al. | 219/130.51 |
| 4,912,299 A | * | 3/1990 | Oros et al. | 219/137 PS |
| 4,994,646 A | | 2/1991 | Tabata et al. | |
| 5,017,757 A | * | 5/1991 | Kawai et al. | 219/130.51 |
| 5,278,390 A | | 1/1994 | Blankenship | |
| 5,525,778 A | * | 6/1996 | Matsui et al. | 219/130.51 |
| 5,643,479 A | | 7/1997 | Lloyd et al. | |
| 5,667,709 A | | 9/1997 | Ueyama et al. | |
| 5,726,419 A | * | 3/1998 | Tabata et al. | 219/130.51 |
| 6,344,627 B1 | | 2/2002 | Yonemori et al. | |

FOREIGN PATENT DOCUMENTS

JP  58-176074  10/1983

* cited by examiner

*Primary Examiner*—Clifford C. Shaw
(74) *Attorney, Agent, or Firm*—Fay, Sharpe, Fagan, Minnich & McKee

(57) ABSTRACT

An electric arc welder including a high speed switching power supply with a controller for creating high frequency current pulses through the gap between a workpiece and a welding wire advancing toward the workpiece, where the pulses and a background current defining a series of weld cycles. A wave shape generator defines the shape of the pulses and the background current including a controlled ramp up and/or ramp down in each of said cycles and a circuit to change the shapes of the pulses and/or background current in a repeating pattern in each of the weld cycles. The shape change in a cycle can be between first and second shapes or by a rhythmic AC modulation.

109 Claims, 12 Drawing Sheets

| WORKPOINT | RAMP UP TIME | PEAK TIME | PEAK AMP | RAMP DOWN TIME | BACKGROUND TIME | BACKGROUND AMP | WFS |
|---|---|---|---|---|---|---|---|
| 100 | 1.4 | 0.6 | 400 | 2.5 | 9 | 30 | 100 |
| 200 | 1.3 | 0.6 | 405 | 2.3 | 4 | 70 | 200 |
| 300 | 1.2 | 0.6 | 410 | 2 | 3 | 100 | 300 |
| 400 | 1.1 | 0.7 | 420 | 1.5 | 2 | 125 | 400 |
| 500 | 1 | 0.7 | 460 | 1 | 1 | 150 | 500 |

ELECTRIC ARC WELDER USING HIGH FREQUENCY PULSES

The present invention relates to the art of electric arc welding using a GMAW process and more particularly to a GMAW electric arc welder that creates a high frequency chain of current pulses to form a series of weld cycles constituting a weld process.

INCORPORATION BY REFERENCE

Electric arc welding of aluminum and aluminum alloy has created a dilemma for manufacturers to obtain a weld having a pleasing outer appearance. It was often necessary to use TIG welding. This welding process does produce a desired weld bead; however, it is costly and relatively slow compared to other types of welding. Consequently, over the years manufacturers of electric arc welders have attempted to develop an electric arc welder that would perform a pulse welding process on aluminum without the disadvantages associated with TIG welding and prior, less than satisfactory pulse welding processes. An early effort in this regard is shown in Tabata U.S. Pat. No. 4,994,646 wherein high frequency pulses are created in a series separated by a quiescent duration to control the weld puddle. This disclosure involves complex combination of various pulses having different frequencies and heights, as well as intentional period delays. This patent is incorporated by reference herein as an early attempt to use MIG welding for aluminum. This is background information relating to the present invention. In a like manner, Ueyama U.S. Pat. No. 5,667,709 is incorporated by reference herein. This patent discloses several prior art MIG welding methods for use in welding of aluminum and aluminum alloy. To overcome the alleged disadvantages of the MIG processes, this patent teaches a MAG welding process using high frequency current pulses, or groups of pulses, having different frequencies or other selected pulse characteristics. This is additional background information that need not be repeated in explaining the present invention. Another patent illustrating background technology is Lloyd U.S. Pat. No. 5,643,479. This patent illustrates a high frequency process using pulses, wherein the individual pulses have controlled pulse shapes determined by ramp up, ramp down, peak current and time durations. Of course, these pulses are formed on a fixed background current. This patent is incorporated by reference herein to show that well known technology exists for adjusting the profile, or shape of high frequency pulses. The present invention relates to a concept wherein the profile or pulse shape is changed for a purpose not contemplated by the Lloyd patent; however, the Lloyd patent is incorporated by reference herein as background technology relating to high frequency pulses for electric arc welding. The area of the individual pulses is changed by modifying ramp up, ramp down, peak current, and/or pulse amplitude. Japanese patent 58-176074 is also incorporated by reference as showing an electric arc welder apparently using high frequency output pulses with changes in the amplitude along the pulse train. All of these patents show background information regarding known technology for using high frequency current pulses for welding. The systems are highly complex and still present certain difficulties with respect to controlling the actual weld process, especially when welding aluminum.

The present invention is used to control a Power Wave electric arc welder sold by The Lincoln Electric Company of Cleveland, Ohio, and disclosed generally in Blankenship U.S. Pat. No. 5,278,390. This patent is incorporated by reference herein as illustrative of an electric arc welder having a waveform generator to control the contour, profile or shape of high frequency pulses generated to perform a pulse welding process.

BACKGROUND OF INVENTION

In welding aluminum and aluminum alloy, substantial research and development work has been directed to the use of a pulse welding process either MIG or MAG, where high frequency pulses direct metal from aluminum weld wire to a molten metal puddle or pool on the workpiece. It is advantageous to coordinate each pulse with a molten ball of aluminum for propulsion to the workpiece. Each pulse should correspond to a given droplet of molten metal. However, such processes generate a substantial amount of heat and agitate the molten aluminum puddle formed during the welding process. To prevent this agitation of the puddles and the resultant deterioration of the appearance of the weld, the pulse welding processes have been used where there are successive delay periods or a reduction in the size of the pulses periodically. In accomplishing this objective, the frequency of the pulses is often drastically reduced. The molten metal in the puddle generally resumes its surface tension configuration where it hardens and does not produce the desired appearance obtainable by TIG welding. High frequency is designed to transfer metal with good arc stability, typically at a one drop per pulse rate, with. the drop diameter close to the wire diameter. Heat input designed for arc stability is the same heat input that controls the puddle heating, cooling, and solidification rate, and thus bead appearance and penetration profile. Heat input optimized for wire melting may not be optimized for puddle melting. Thus, prior pulse control systems sacrificed weld quality or bead appearance by employing a pulse delay or drastically changed pulse spacing. Consequently, prior art high frequency pulse welding for aluminum has not resulted in high quality outer appearance of the resulting weld bead without substantial modification of the pulses, discontinuation of the pulses or otherwise periodic disruption of the weld process, with the resultant degradation of the weld process. Consequently, there is a need for a system to create high frequency pulses that overcome difficulties experienced in electric arc welding of aluminum and aluminum alloy.

THE INVENTION

The present invention overcomes the disadvantage of prior efforts to use high frequency pulse welding for aluminum by creating a series of high frequency pulses having a frequency in the range of 50–400 Hz so that each pulse can generally correspond to a deposition globular of aluminum in the pulse welding process. This use of separate and distinct pulses for droplet transfer in the pulse welding process has the advantage of efficient transfer of molten metal and thus high deposition rate. The high frequency pulses are continuous to maximized efficiency and heat for the weld process. However, the high frequency pulses, in accordance with the invention, are modulated at a frequency scaled to the size of the weld puddle, depending upon the wire feed speed, travel speed, and plate thickness. The smaller the puddle, the higher the low frequency used for modulation. This frequency is between about ¼ Hz to 40 Hz. By compromising "one droplet per pulse" design rule, individual high frequency pulse energy is modulated based upon the low frequency puddle formation. A weld bead having distinct and equally spaced ripple and uniform fusion line is obtained. While the instantaneous melt-off rate and arc length indeed alternates between high and low values at low modulation frequency, the average arc length and average melt-off rate is still maintained. By the technique of merely modulating high frequency pulses with a low frequency factor, there is no need for complex digital processing to form quiescent periods and/or complex weld profiles that cannot be coordinated with the frequency for transfer of globulars.

The shaped individual high frequency current pulses are produced by the pulse width modulator at a frequency in the range of 50–400 Hz. They are individually profiled by the wave shaper. Indeed, this profiling of the pulses creates high energy current pulses for the high energy portion of the weld cycle and low energy current pulses for the low energy portion of the weld cycle. The integrated shape is the heat energy of a pulse. Shaping of the pulses is made possible by the use of a high speed switching power supply with a wave shape to generator or wave shaper.

In one aspect of the invention, the pulses are each formed with a selected a ramp up, ramp down and peak current. These pulses have the same high frequency, and thus identical periods and are preferably constant peak currents to facilitate arc length feedback. By changing the slope of the ramp up, the energy of an individual pulse is changed. Likewise, changing the ramp down affects the energy of the pulse. The high energy pulses have a rapid ramp up and a slow ramp down. The ramp down can be exponential, as a time constant curve controlled by the wave shape generator. By maintaining the peak current and background current the same, the changes in the slope changes the energy of the pulse. During the high energy portion of the weld cycle, pulses with high energy are created by the wave shape generator. During the low energy portion of the weld cycle, pulses with low energy are created. The shape or profile of the pulses can be controlled by the above discussed shape features, or others, such as peak current time, ramp up time, ramp down time, and background current time and/or amplitude.

To shift between the high heat and low heat portions of the cycle, another aspect of the invention provides a counter for counting the pulses in one energy portion. When the preselected count number for one energy portion is reached, the wave shape generator shifts to the other portion. In this technique, one portion of a weld cycle has a certain set count number and another portion of the same cycle has a set count number. When these set count numbers are reached, there is a shift to the other portion. Consequently, the length of the weld cycle is determined by the total number of pulses constituting the two portions. In this manner, the weld cycle shifts between high and low heat or energy portions at a low frequency matching generally the natural frequency of the weld puddle. If higher heat is desired for the weld process, the count number for the high energy portion of the weld cycle is increased or the count number for the low energy portion is decreased. If a desired frequency for the total weld cycle is required, these number changes are coordinated. The selection of a count number can control the length of the weld cycle and the low frequency of the shift between portions. In accordance with a subordinate aspect of the invention, a software circuit or program is implemented wherein the number of pulses in the high energy portion is gradually increased from the start of the weld cycle. Thus, welding of aluminum commences at a low energy level. The count number of the high heat portion gradually increases so the high energy portion of the weld operation continues to increase. This increase in heat preferably occurs during the total welding operation. As an alternative, the heat increases for only a short time after the start of the weld operation. Both of these implementations have been made, but are dictated by the welding engineer of the manufacturing facility using the present invention.

In accordance with another aspect of the present invention, a standard wire feeder driven by a motor according to the level of a WFS signal is coordinated with the high and low energy or heat portions of the weld cycle in a "synergistic" control. During the high energy portion of the weld cycle, the level of the WFS signal is increased to have an increased wire feed speed. In a like manner, the level of the WFS signal during the low energy portion of the weld cycle is lowered to produce a lower wire feed speed. This coordinates the wire feed speed with the heat energy of the welding operation. If the energy level of a weld cycle is modulated by a factor or gain having the characteristics of a sine wave, saw tooth or AC curve, the wire feed speed is modulated accordingly to coordinate the wire feed speed with the energy or heat.

In another aspect of the present invention, there is provided a method of operating an electric arc welder of the type including a high speed switching power supply with a controller for creating high frequency current pulses through the gap between a workpiece and a welding wire advancing toward the workpiece so that the current pulses, together with background current, define a series of repeating weld cycles. This method involves shaping the pulses and background current in each of the weld cycles and forming the individual weld cycles into a pattern of pulses and background current between a high energy portion and a low energy portion, with the portions alternating at a low frequency. The high frequency of the pulses is substantially greater than the low frequency of the alternating weld cycle. This method controls the welder in a manner discussed with respect to the novel system used to control the welder. As one control feature of the method, the pulses of the individual portions are counted and the high and low energy portions are shifted according to the count number assigned to the portions. In some instances, the numbers assigned to the portions are the same; however, normally they are different. Indeed, the amount of heat created by the weld operation is dictated by the relationship of the high energy portion count number to the low energy portion count number. In accordance with an aspect of the invention, the count is controlled by an arc length feedback signal obtained by sensing the arc voltage. As the arc voltage changes, the preselected count number of one of the portions, or both of the portions, is modified to maintain the desired arc length. An aspect of the invention involves gradually decreasing the number assigned to the high energy portion from the start of the weld operation for at least several of the ending weld cycles. Thus, the weld is completed mostly at high heat and then gradually approaches a low heat level at the finish.

In accordance with another aspect of the present invention, an electric arc welder having a high speed switching power supply for creating equally spaced pulses and a background current defining a series of weld cycles has a wave shape generator or wave shaper. The output of the wave shaper defines the shape of the individual pulses and background current for each weld cycle. In this aspect of the invention, there is provided a circuit, which is generally a software program, to change the shape of the equally spaced pulses or background current in a repeating pattern. This repeating pattern is a modulation factor which is selected from a group consisting of a sine wave with a low frequency, an alternating generally square wave with a low frequency, a saw tooth curve with a low frequency, and an alternating curvilinear curve with a low frequency. This low frequency of the modulating factor or signal is generally less than about 30 Hz. In accordance with this aspect of the invention, the profile or shape of the pulses include a ramp up time, a ramp down time, and a peak current and a peak width or peak time. The peak time combined with the ramp up time and the ramp down time defines the period of the current pulse. The magnitude is also determined by the peak amplitude. By multiplying any of these pulse features by the modulation signal, the weld cycle modulates in the selected feature according to the modulation signal. In a like manner, the background current multiplied by one of the modulation signals causes the background current to fluctuate according to the signal. Thus, the low frequency modulation of the weld cycle is the modulation of the background current amplitude.

In accordance with another aspect of the invention, there is provided a welder having a high speed switching power supply and a controller for creating a weld process including high frequency current pulses through the gap between a workpiece and a welding wire advancing toward the workpiece. The high frequency current pulses define a series of weld cycles. A circuit or software program forms the cycles into a pattern of pulses between a high energy portion and a low energy portion, with the portions alternating at a low frequency. The high frequency of the pulses is substantially greater than the low frequency of the alternative portions of a weld cycle. In a accordance with this aspect of the invention, the wire feeder of the welder, which has a speed set by the value of a WFS signal, is shifted in accordance with the high and low energy portions. This aspect of the invention is generally implemented by a work point look-up table. However, the invention can be implemented by using the modulation signal wherein the wire feed signal is modulated according to the signal used to modulate the pulses constituting the repeating weld cycles. Using work point look-up tables, the frequency of the pulses during the high and low energy portions are not necessarily of the same frequency as in the preferred embodiment. This aspect of the invention is "synergistic" in that the wire feed speed is coordinated with the fluctuation of the welder output. Another aspect is the provision of a method for performing the operations set forth in the description of the welder.

Still a further aspect of the invention is the provision of an electric arc welder including a high speed switching power supply with a controller for creating a first and second weld process across the gap between the workpiece and a welding wire advanced toward the workpiece by a wire feeder driven at a speed set by the level of a WFS signal. The first process uses a first current wave form and a first level for the WFS signal. Likewise, the second process uses a second current wave form and a second level of the WFS signal. A software program alternates the controller between the first and second weld process at a low frequency. The weld cycle or pulses in both the first and second processes are counted. A circuit shifts from one weld process to the other weld process, when the count reaches a preselected number. The preselected number for the first and second weld processes can be either the same or different and can be adjusted during machine set up. A further feature of this aspect is that the invention involves the method of operating an arc welder for alternating between distinct weld processes in accordance with counting of the pulses in the individual weld processes.

The primary object of the present invention is the provision of an electric arc welder, and method of operating the welder, that is useful for aluminum and aluminum alloy and includes high frequency current pulses modulated by a low frequency factor to define individual repeating weld cycles.

Yet another object of the present invention is the provision of a welder and method, as defined above, which welder and method modulates the high frequency current pulses in a manner to produce heat that alternates at a low frequency during individual weld cycles of the weld process.

Still a further object of the present invention is the provision of a welder and method, as defined above, which welder and method produces a controlled ripple in a weld bead of aluminum welding operation while coordinating and controlling the heat used during the welding operation.

Still a further object of the present invention is the provision of a welder and method, as defined above, which welder and method coordinates the speed of the wire feeder with the heat created during different portions of the repeating weld cycle constituting the total welding operation.

Another object of the invention is the provision of a welder and method for performing alternately two separate pulse welding processes, whereby one process is high heat and the other process is low heat. The welder and method alternates between the two processes.

Still a further object of the present invention is the provision of a welder and method of operating a welder, which welder and method reduces porosity, increases gap tolerance and wire-to-joint offset tolerance. The action of the weld puddle is controlled during the welding operation, especially when welding aluminum or aluminum alloy.

Another object of the present invention is the provision of a welder and method of operating the welder, which welder and method optimizes the relationship between the heat used for melting the electrode and the heat used for melting the metal forming the workpiece where these two heat operations have different heat demands.

These and other objects and advantages will become apparent from the following description taken together with the accompanying drawings.

PREFERRED EMBODIMENT

Figure 1:
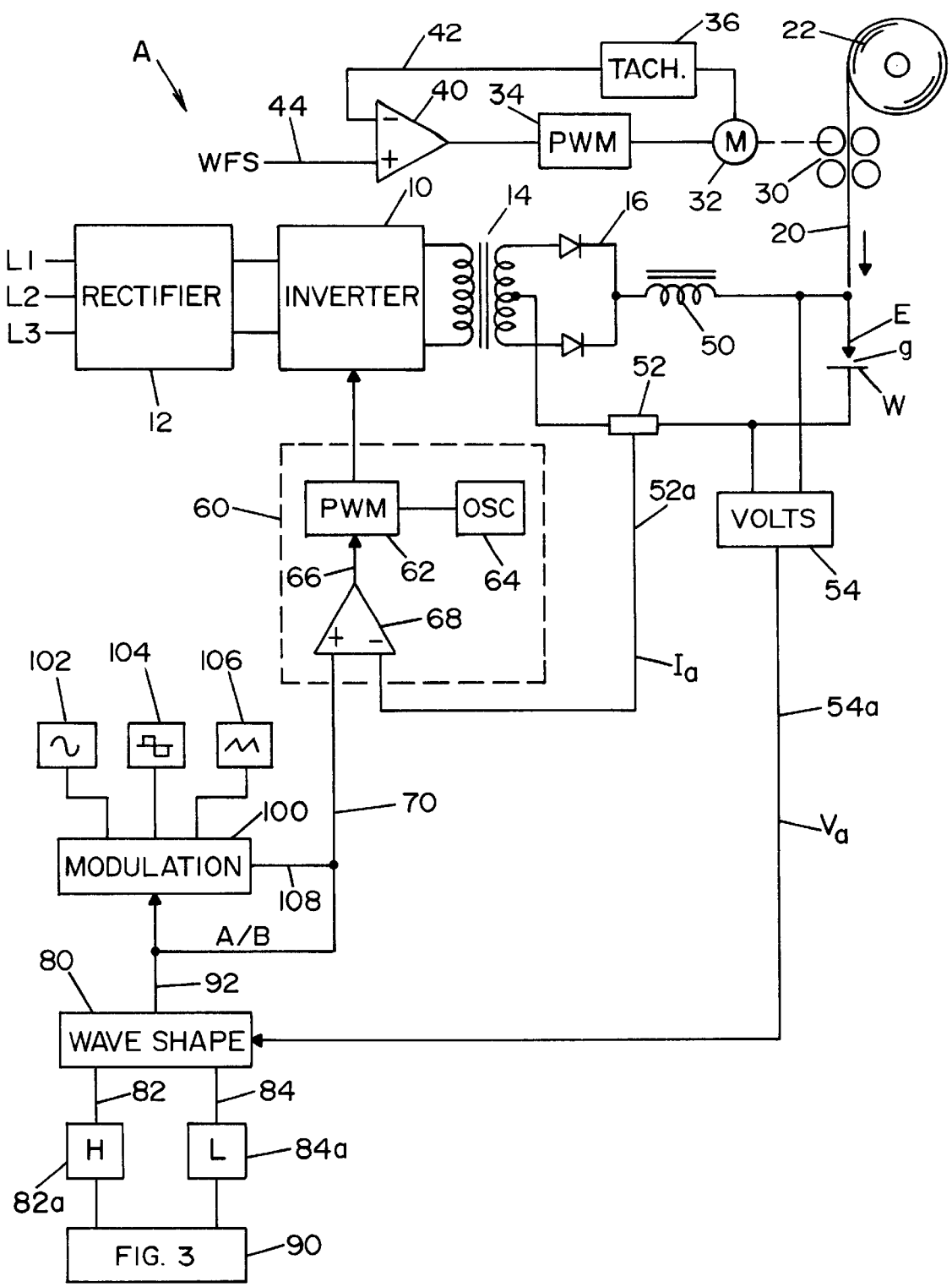
FIG. 1 is a combined block diagram and system architecture for performing the preferred embodiment of the present invention.
Figure 2:
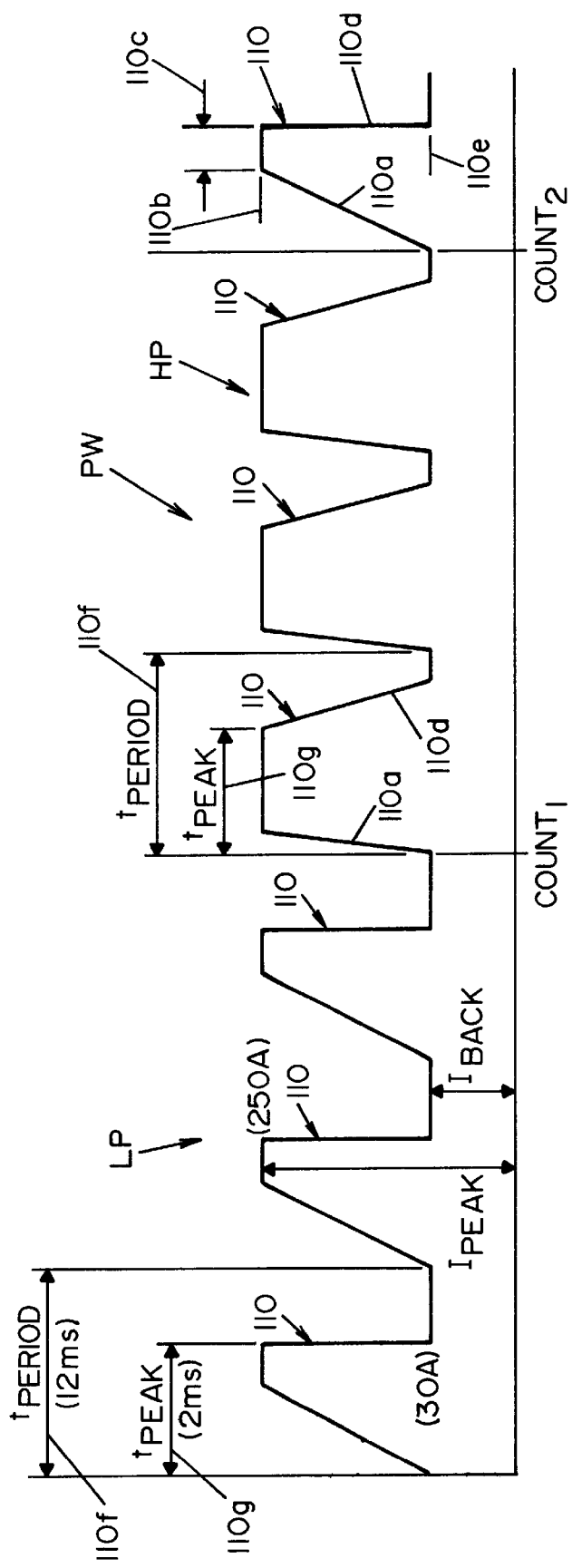
FIG. 2 is a current graph illustrating the high frequency pulses used in the preferred embodiment of the present invention.

Referring now to the drawings, wherein the showings are for the purpose of illustrating preferred embodiments of the invention only and not for the purpose of limiting same, FIG. 1 discloses welder A having generally standard configuration including a high speed switching power supply 10, such as an inverter or buck converter, with an input rectifier 12 and an output transformer 14 directing current pulses by way of output rectifier 16 to an electrode E. The electrode includes an aluminum wire 20 from a spool or drum 22 and advanced by feeder 30 toward workpiece W through the action of motor 32. Pulse width modulator 34 controls the speed of motor 32 and thus feeder 30 under direction of a feed back tachometer 36 and an operational amplifier 40 for comparing input 42 from tachometer 36 with a command WFS signal in the form of a level on line 44. As the aluminum electrode or wire E advances toward workpiece W, an arc is created across gap g by a series of current pulses combined with a background current. Inductor 50 smooths the current ripple of the switching power supply. Arc current is read by sensor 52 to create a voltage in line 52a representing arc current $I_a$. In a like manner, arc voltage is sensed by sensor 54 to create a voltage on line 54a representative of arc voltage $V_a$. In accordance with standard practice, a digital processing device represented as controller 60 causes power supply 10 to create pulses across gap g in accordance with the feedback current and/or voltage. Controller 60 is illustrated as including a pulse width modulator 62 driven by oscillator 64 having a frequency exceeding 18 kHz. The pulse width modulator produces a current pulse during each output of the oscillator. The width determines the amplitude of the current pulse. The level of current during the welding cycle includes many pulses from pulse width modulator 62 so the current follows the voltage on line 66 illustrated as the output of error amplifier 68 receiving a command signal on line 70. As so far described, welder A is a standard welder with controller 60 controlling the wave shape of the current pulses defining the welding cycle or welding operation performed at gap g referred to as the welding arc. The voltage on line 70 determines the profile, shape, or contour of the current pulses of the welding process. As popularized by the Power Wave welder sold by The Lincoln Electric Company, the voltage on line 70 is controlled by a wave shaper or generator 80. Output 92 of the wave shape generator 80 dictates the current pulses in the welding process. In accordance with the invention, wave shaper 80 controls the signal on line 92 to alternate between a high energy portion dictated by a signal on line 82 from the shape selector or software 82a. In a like manner, the signal on line 84 controls the low energy portion of the welding process under control of shape selector or software 84a. These shape selectors dictate, in one aspect of the invention, the shape of the pulses used in the welding process. A weld cycle in the process involves an alternation between selector 82a and selector 84a. Control logic 90 shown in FIG. 3 repeatedly initiates software or selectors 82a and 84a in sequence. Output 92 is communicated with control line 70. The embodiment of the invention shown in FIG. 2 is performed by wave shaper 80 to control the high energy and low energy portions of the welding cycle. The operation is by alternately actuating selectors 82a, 84a to output a signal matching the curve of FIG. 2 by operation of control logic 90 shown in FIG. 3. As will be explained later, an alternative embodiment of the invention utilizes modulator 100 producing one of several repeating modulation curves having a variety of magnitude alternating shapes such as a sine wave from selector block 102, an alternating current or square wave by selector block 104 or a saw tooth curve from selector block 106. The selector blocks cause modulation by a curve from modulator 100. This curve is outputted on line 108. As will be explained with respect to FIG. 7, the modulated signal from line 108 is obtained by multiplying a feature of the signal on line 92 by a curve represented by one of the blocks 102–106. This process produces a low frequency modulated weld cycle. This aspect is explained with respect to the diagram of FIG. 7. In practice, the preferred operation is illustrated by the current graph in FIG. 2 and does not involve the curve modulator 100, which is used in a second implementation of the present invention. Thus, the first implementation of the invention will be described as wave shaper 80 having an output 92 for controlling the voltage current command signal on line 70. The other implementations will be described with other drawings even though they are illustrated as parallel implementations in FIG. 1. Alternating back and forth between high energy and low energy portions of the weld cycle as shown in FIG. 2 does not involve the modulator 100, but it is a subset of modulation of the weld cycle.

In accordance with the preferred embodiment of the present invention, pulse wave PW shown inn FIG. 2 is formed by wave shaper 80 into a low energy portion LP terminating after a certain number of pulses $COUNT_1$ and high energy portion HP terminating after a number of pulses indicated as $COUNT_2$. High energy portion HP is controlled by the shape selector or software 82a of FIG. 1 and the pulses in low energy portion LP are shaped by selector or software 84a in FIG. 1. In FIG. 2 the pulses have a fixed period and their area determines the heat created in the welding process by each pulse. Pulse wave PW alternates between the low energy portion and high energy portion to define a weld cycle. These cycles are repeated during the total welding process. Pulses 110 are created by wave shaper 80 at a frequency in the range of 50–400 Hz. This frequency is selected in an effort to optimize the pulse rate with the droplet rate of the molten aluminum. The pulse rate controls the heat of the weld and the heat in the puddle. These two aspects must be coordinated. Each pulse has a ramp up portion 110a with a controlled slope, a peak current portion 110b which is the same for all pulses shown, a peak time portion 110c which is the time that the current level is at a peak, a ramp down portion 110d and a background current portion 110e. The background current is constant whereas the pulses 110 have a different area and thus different heat. In the alternative, each pulse can be defined as having a period 110f which, in the preferred embodiment, is constant. Also constant is the peak total time 110g. Thus, to change the heat of a pulse, during the low energy portion LP ramp up 110a is slow and ramp down 110d is fast. This gives a very short time 110c and a very long time when only the background current 110e is flowing across the arc at the welding gap. Pulses 110 in high energy portion HP are larger. The times 110f and 110g are constant; however, ramp up 110a is fast and ramp down 110d is slow. Thus the slope of the leading edge, or ramp up, 110a and the trailing edge, or ramp down, 110d is adjusted by shape selectors or software 82a, 84a to create a series of low energy pulses and a series of high energy pulses with a pattern repeating in each weld cycle. The heat created by the welding process is determined by the differences in the areas of the two current pulses and by the number constituting $COUNT_1$ and COUNT$_2$. When these count numbers are reached, the pulse wave PW shifts between the two energy portions of a weld cycle.

The welding operation involves a weld cycle having a low energy portion LP and a high energy portion. The frequency of these two portions is low compared to the frequency of pulses 110. In practice, the frequency of the pulses is in the range of 50–400 Hz, whereas the alternating frequency between the high and low energy portions of pulse wave PW is in the range of ¼ to 40 Hz. The main aspect of this concept is that the high frequency is substantially greater than the low frequency. Consequently, if the high frequency is in the range of 300 Hz, the low frequency could be in the range of 20–30 Hz or any like ratio versions. To set the desired low frequency, pulses 110 in one portion LP, HP are counted. The wave form of pulses 110 is shifted to the other portion awaiting the count of this next portion. The count numbers need not be the same; however, in practice they are quite close. To shift from one portion of the wave form to the other portion, there is provided a control logic 90 shown in FIG. 3. Counter 120 for COUNT C1 has a NO line 122 for initiating the low heat pulse profile shown in FIG. 2 which is controlled generally by operation of shaping selector or software 84a. The low energy pulse has a ramp up current with a slope that terminates at time tR1 as shown by step 124. Then the peak current portion P1 is implemented until time tP1 as shown at step 126. Thereafter, there is an exponential decay at a speed 1 until time tS1 as shown by step 128. These shape forming operations are shown progressively as blocks or steps 124, 126 and 128, respectively, and are controlled by the wave shaper implementing the shape in software 84a. Background current B1 for the low energy pulse is maintained at a level as indicated by block or step 130. The time for the background current is tB1. This is the time between the end of the ramp down and the start of the next ramp up, as shown in FIG. 2. This time is controlled by the slope of the ramp down portion 110d. The background current is maintained constant throughout the particular welding process shown in FIG. 2. At the end of the formation of a low energy pulse 110, block or step 132 increments the C1 counter as indicated by a signal in line 134. When counter 120 has been incremented to the set number N1, then a logic signal is received in line 140 to reset the C2 counter and start processing of high energy pulses. This is portrayed by line 150 to activate blocks or steps 152, 154 and 156 in sequence to produce the ramp up, peak current and ramp down of the high energy pulses in portion HP. These steps are controlled by the wave shaper. Thereafter, the background current is maintained as indicated by step 158. The expiration times are used in practice to determine the shifting between the various portions of the wave shape constituting pulses 110. Background B2 which is equal to background B1 expires at the start of the next cycle and has a time tB2. Block or step 160 increments C2 counter 162 by a logic in line 160a. If the count number of the high energy portion has not been reached N2, line 164 recreates the next high energy pulse. If counter 162 has counted out by reaching number N2, a logic signal in line 166 activates reset step 168 having an output 170 to initiate the first pulse of the next low energy portion of the pulse wave. By using the logic in FIG. 3, pulses 110 are first low energy pulses and then high energy pulses to complete a weld cycle. The frequency of this alternation in energy level is low compared to the high frequency of the individual pulses 110. This overlay of low frequency operation on high frequency pulse waves results in the advantages above set forth.

Figure 3:
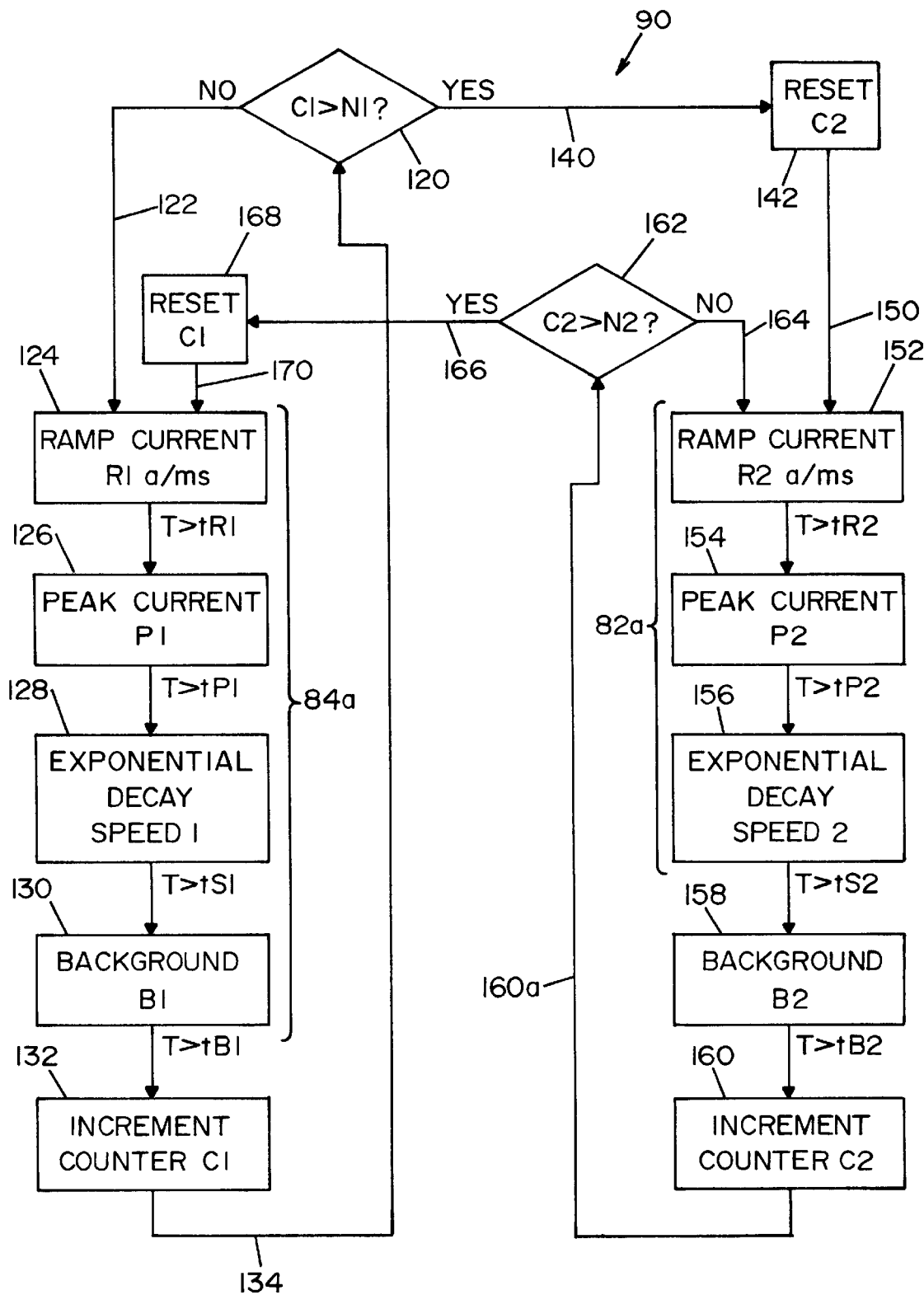
FIG. 3 is a logic diagram and flow chart to obtain the high frequency pulses in FIG. 2 and used for implementation of the preferred embodiment shown in FIG. 1.
Figure 3A:
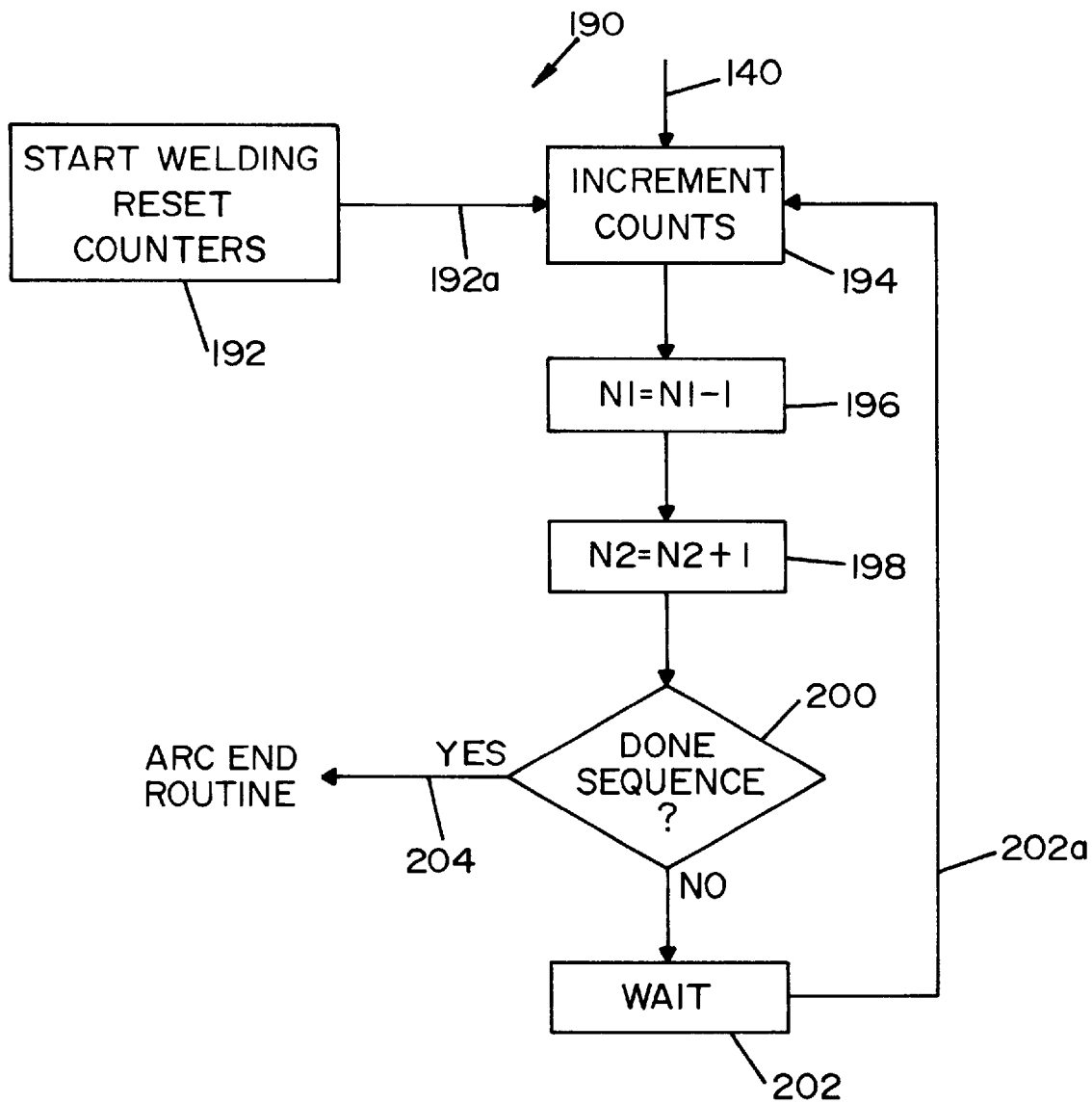
FIG. 3A is a logic diagram and flow chart of an addition to the flow chart of FIG. 3.

Referring now to FIG. 3A a supplemental control logic 190 is illustrated wherein the heat of the welding process at the start of the weld is high and progressively decreases during welding. This is advantageous when starting a weld of aluminum or aluminum alloy. A heat taper down prevents melt-through at the end of the weld. A variety of control logics could be used for this purpose; however, in practice a start welding sequence is indicated by block or step 192. This step resets counter 120 at the start of a weld to a high number and resets counter 162 to a low number. Consequently, at the end of the welding process, the last few cycles have relatively low total heat input to prevent burn through, especially when welding aluminum. Line 192a from step 192 activates the increment count block or step 194. Upon conclusion of one of the energy portions, indicated by logic on line 140, block or step 194 causes count number N1 to decrement as indicated by block or step 196. At the same time, count number N2 increments as indicated by block 198. Another implementation is having block 198 without block 196. Yet another implementation is having block 196 without block 198. Yet another implementation is having block 196 alone at the first half of the weld followed by having block 198 alone at the second half of the weld. This is done for a set sequence indicated by block 200. The sequence could be the end of the weld or a specific time or count of cycles during the welding process. The termination phase does not form a part of the present invention. In practice, it is set to the end of the weld process. If the sequence is not concluded, step 202 causes a signal in line 202a to continue increase in the heat of the weld cycle. When the sequence is completed, step 200 signal in line 204 creates a signal to end subroutine. FIG. 3 is merely representative of a subroutine used for decreasing the heat from a high value at the start of the weld process to a lower value as the process progresses. This prevents unwanted melt through at the end of the weld cycle. FIGS. 3 and 3A, like FIG. 1, show the invention in diagram form to disclose the digital processing software used to implement the invention.

Figure 4:
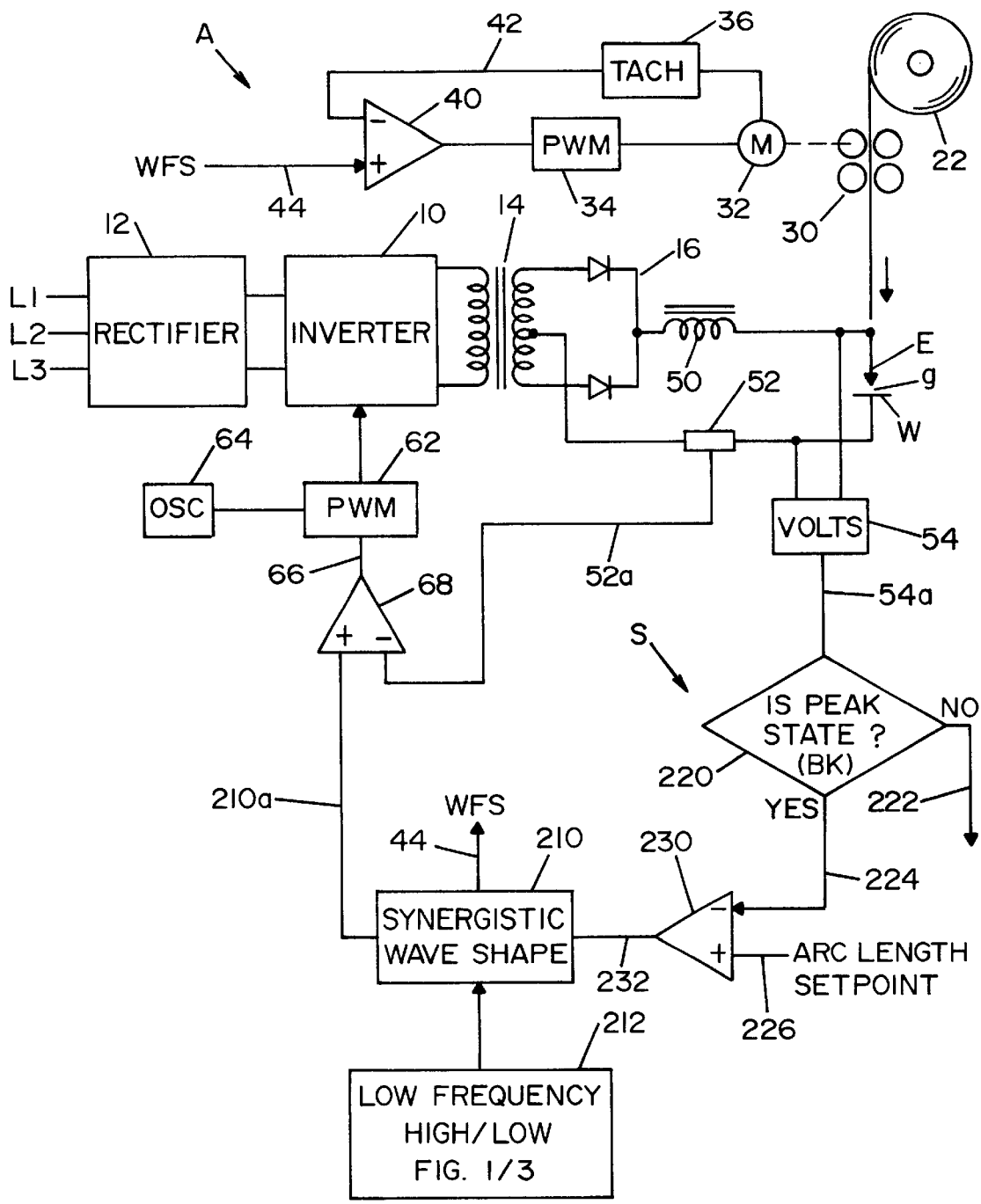
FIG. 4 is a flow chart and system architecture of a modification of the preferred embodiment of the present invention as shown in FIG. 1.

A further modification of the invention is illustrated in FIG. 4, wherein a "synergistic" control action is implemented by wave shaper 210 to create pulses as shown in FIG. 2. The pulses of a cycle alternate between high and low heat. The previously described circuitry to obtain this wave shape is schematically represented as block 212. Welder A has the components described in connection with FIG. 1 and includes a wire feeder 30 so wire E is fed into the welding operation in accordance with the level of the WFS signal on line 44. Wave shaper 210 controls the signal on line 44 as it has a high signal when the high energy portion HP is being processed and a low level when the low energy portion LP is being processed. Portions HP and LP combine to produce a repeating low frequency weld cycle. Consequently, the modification shown in FIG. 4 merely adds to the previously described embodiment by outputting a voltage level on line 44 that tracks the energy level being processed by the welder as shown in FIGS. 1–3. In this manner, there is a synergistic effect between the high and low energy portions and the wire feed speed of electrode E. FIG. 4 illustrates a further modification used with the invention. As the arc length is increased by an operator or a robot, the heat is changed. To compensate for changes in the arc length, welder A is provided with a control system S wherein the voltage on line 54a is representative of the arc length. This measurement must be taken during a portion of pulses 110 where the current is normally constant and not subject to modulation. An example of such portion is the peak current or background current BK that is maintained at a desired level.

Consequently, discrimination block 220 reads the voltage on line 54a only during the peak current times, or the background current times. The signal on line 54a is discarded as indicated by line 220 at other times during pulse 110. Thus, the voltage read on line 224 is a constant peak current voltage that changes according to arc length variations. As the arc length increases the voltage increases. This signal representative of arc length is directed to error amplifier 230 by line 224 where it is compared to the arc length set point signal on line 226. The output of amplifier 230 in line 232 is the variation of the arc length from the set point. When the arc length is too high, the heat is increased. Consequently, synergistic wave shaper 210 has a subroutine reading the value on line 232 to change a parameter of the pulse wave PW of FIG. 2. Since the heat is too high, the size of the pulse is decreased. in the high energy portion HP. This decreases the heat. In a like manner, if the heat is too low as determined by a lower voltage on line 224, pulses 110 in the high heat or high energy portion HP are increased in size. Of course, the level of voltage on line 232 could change the count number of the high energy or high heat portion of the pulse wave to modify the heating to compensate for, and correct, variations in arc length. In summary, system S measures arc length and changes the heat of the welding process to compensate for variations in the arc length. The synergistic wave shaper 210 also outputs a signal on line 44 to correlate the feed speed of the wire with the heat being generated in the welding process. The wave shaper also controls the command signal on line 210a. Other synergistic modifications can be made to the wave shaper to accommodate various corrective actions and control functions in welder A.

As illustrated in FIG. 4, system S filters the arc current on line 54a to select the current in a specific constant segment of the wave shape, which segment is not subject to show frequency modulation. Such segments are normally peak currents or background currents, when the background current is not modulated. The actual voltage in the selected segment is directed by line 224 to the negative input of error amplifier 230. The positive input is the arc length set point voltage on line 226 so output line 232 controls arc length by adjustment of a specific aspect of the high frequency pulses, such as peak current or peak time. This arc length control system is used in the synergistic program or in control of only the pulses as shown in FIGS. 1 and 2.

Figures 5, 5A:
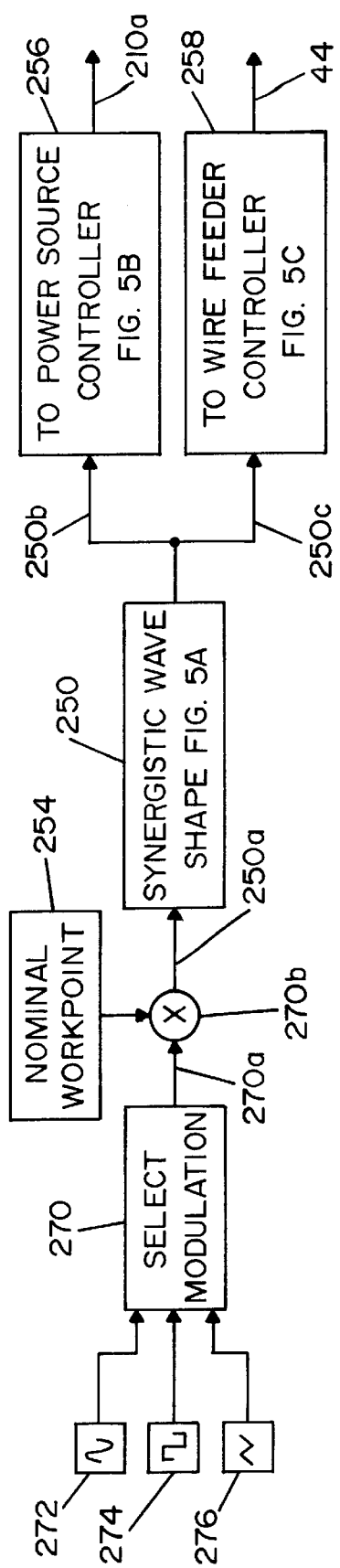
FIGS. 5, 5A, 5B, and 5C are block diagram of a further implementation of the present invention wherein both the pulse frequency and wire feed rate are coordinated by the look-up table shown in FIG. 5A to produce the results shown in the graphs of FIGS. 5B and 5C.
Figure 5B:
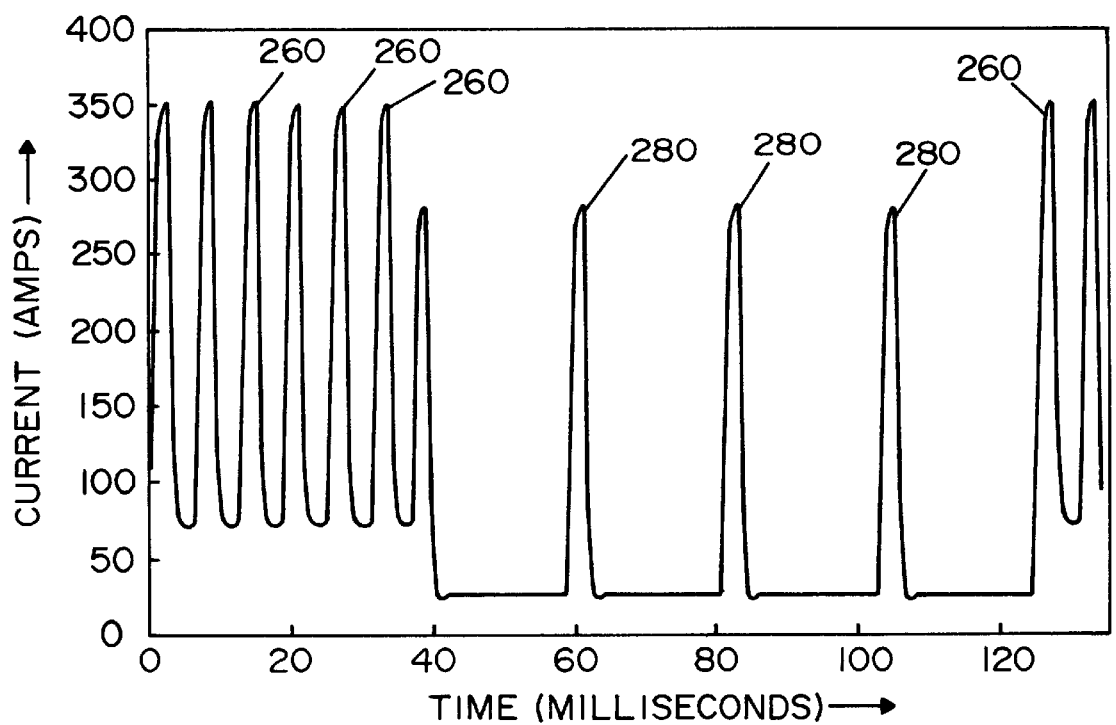
Figure 5C:
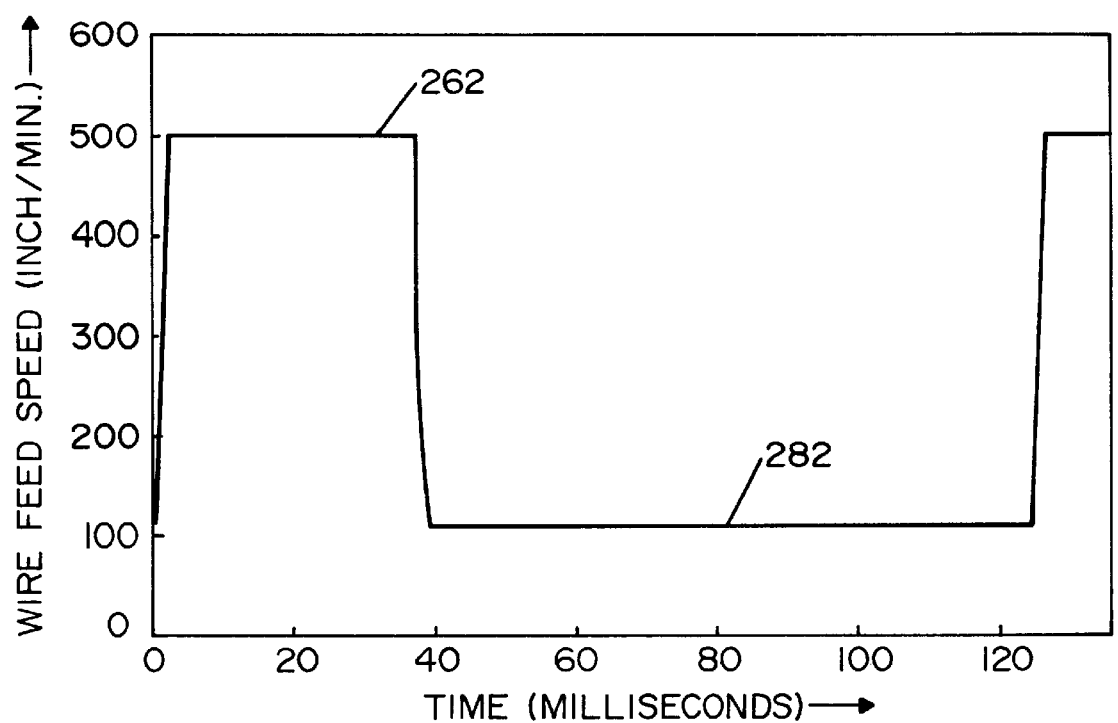

Another use of concepts employed in the present invention is illustrated in FIGS. 5, 5A, 5B and 5C. In this embodiment, a synergistic wave shaper 250 is employed to process the work point from look-up table 252 in accordance with the value of the input signal represented by line 250a. The work point represented by the level of the signal on line 250a is outputted in accordance with the look-up table 252. The pulse features and wire feed speed for a selected work point is used to control the shape of the pulse by controller 256 and the wire feed speed by controller 258. The pulse shapes as shown in FIG. 2 are implemented by the wave shaper or controller 256 by a signal on line 210a. Coordinated with the work point is a signal on line 44 as directed by controller 258. The wave shaper 250 produces a wave shape and a wire feed speed determined by the work point of look-up table 252. The normal work point for the welder is outputted from selector 254 for communication with the wave shaper 250 and output lines 250b, 250c by input line 250a. This produces a preselected series of pulses having a shape as indicated by pulses 260 in FIG. 5B. At the same time, the output on line 44 from the look-up table 252 produces a WFS signal having a level 262 as shown in FIG. 5C. As so far described, the high frequency pulses 260 and the wire feed speed are controlled. An arc length feedback system S as shown in FIG. 4 is implemented in this welding process. In accordance with the invention, the work point from table 252 is changed progressively during each weld cycle. This produces a low frequency component to the welding process. In the illustrated embodiment, modulator 270 has an alternating output in line 270a that is multiplied with the set or normal work point from selector 254 by multiplier 270b. Thus, the level of voltage on line 250a is modulated according to the output of modulator 270. This modulator selects a repeating curve, such as a sine wave at selector block 272, square wave at selector block 274 or a saw tooth wave at selector block 276. In the illustrated embodiment, the square wave of block 274 is selected so that the welding process has a weld cycle which shifts from one work point to the other at a low frequency in the general range of ¼–40 Hz. As shown in FIGS. 5B and 5C the low energy portion of the weld cycle includes pulses 280 and a low WFS level 282. By shifting from one work point to the next selected work point and repeating this process, the high heat caused by pulses 260 are alternated with the low heat caused by pulses 280. At the same time, the wave shaper causes the voltage level on line 44 to shift between high level 262 and low level 282. In the illustrated embodiment, the modulation from curve or block 274 has a longer low heat portion than the high heat portion. In addition, the pulses have a different frequency and the background current has a different level. This is not the same as the preferred embodiment wherein the pulses have the same frequency and background current. A change in shape is used to alternate between high heat and low heat. This embodiment of the invention in FIGS. 5, 5A, 5B, and 5C is used to illustrate a broad aspect of the invention wherein the repeating weld cycles are coordinated with the feed speed of the wire while having drastic changes in the heat being delivered to the arc. A synergistic wave shaper as contemplated by the embodiments shown in FIGS. 4 and 5 is used to coordinate wire feed speed with the high and low heat portions of the weld cycle. When coordinating the wire feed speed with the high and low or alternating heat levels, the limitation of equally spaced current pulses is not applicable or required.

Figure 6:
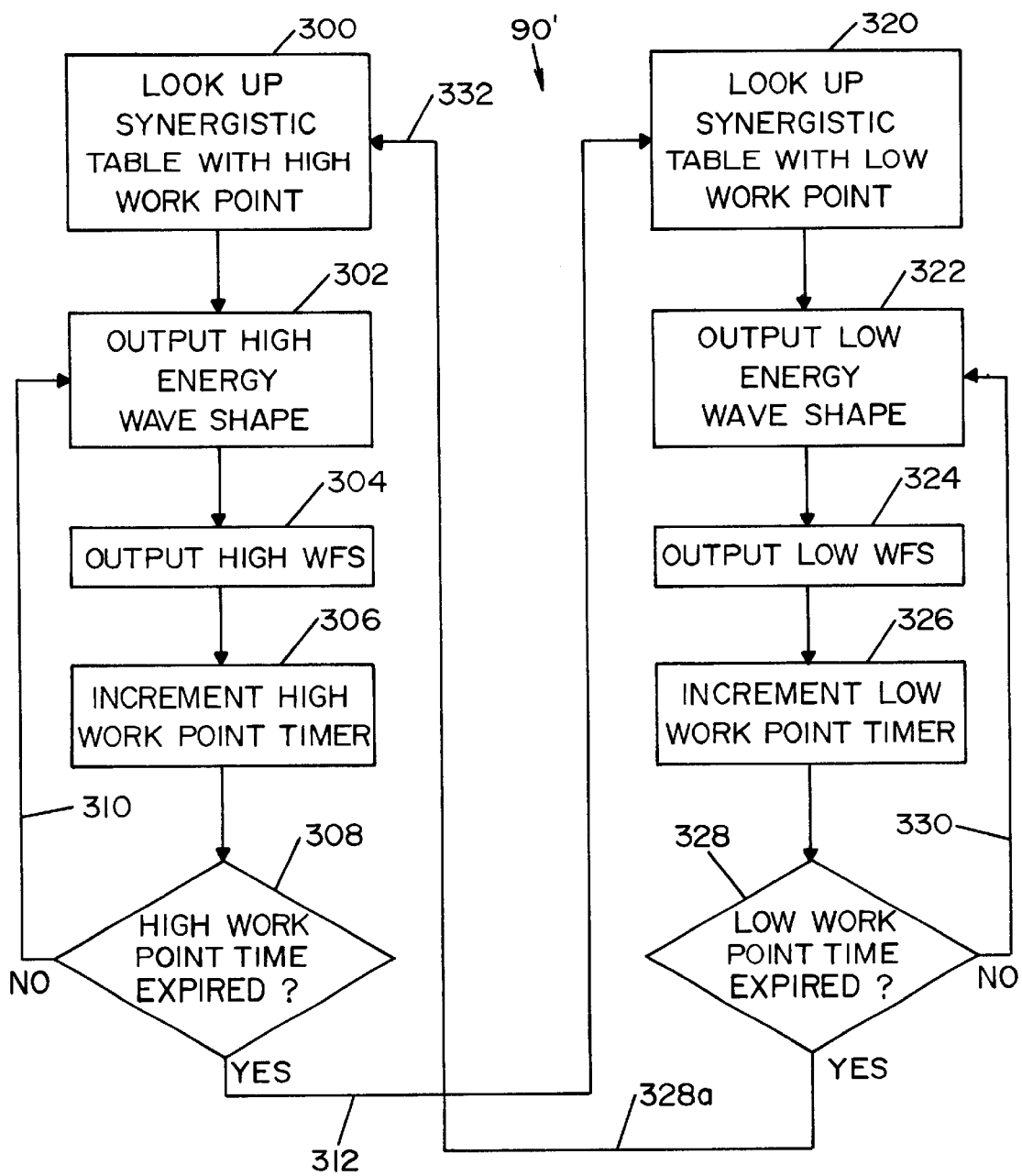
FIG. 6 is a logic diagram and flow chart similar to FIG. 3 for use with the embodiment of the invention illustrated in FIG. 5.

A synergistic process that combines the high and low heat control with wire feed speed control is shown in FIG. 6. Shifting between high level and low level is by a timing operation, even though counting using control logic 90 of FIG. 3 could be employed. The timing concept for the synergistic process involves control logic 90' having initiation of the high work point by step or block 300. At the start of the weld cycle, this step or block is implemented. The control logic first interrogates the synergistic look-up table for the high work point. This high work point is selected as indicated by steps 302, 304 to create a shape control signal on line 210a from power source controller 256 in FIG. 5. Thereafter, the high wire feed speed signal is outputted on line 44 from the wire feed speed controller 258. Then step 306 increments timer 308, set at a desired time. This desired time can be adjusted according to the arc length error signal in line 232 from control system S, as shown in FIG. 4. If timer 308 has not timed out, the high heat current pulses and the high wire feed speed is continued as indicated by line 310. Ultimately, when timer 308 times, out, a signal in line 312 activates step 320 to select the low work point from look-up table 252. This first implements the low energy or low heat pulses indicated by step 322 and then the low speed for the wire feeder as indicated by step 324. Thereafter, step 326 increments set timer 328 and determines whether the timer has expired. If not, the low heat and low wire feed speed cycle is continued as indicated by line 330. When timer 328 times out, the signal on line 328a activates step of block 332 to repeat the High heat and high wire feed speed synergistic action of the electric arc welder. By using control logic 90', the high feed speed and low feed speed is coordinated with the high heat and low heat at a low frequency. This timing function could be used as a substitute for the counting function in FIG. 3.

Figure 7:
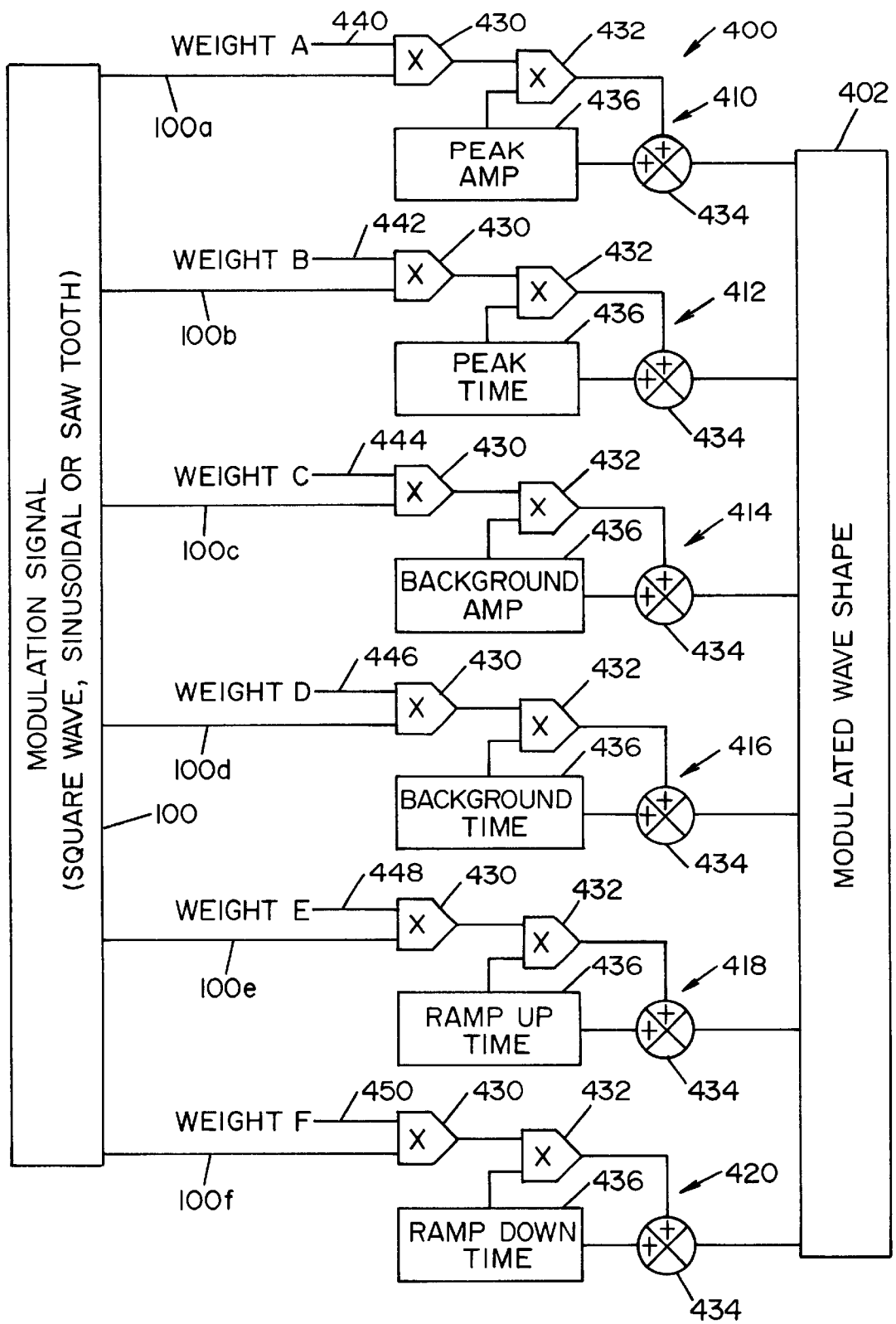
FIG. 7 is a block diagram and logic network used in practicing the preferred embodiment of the present invention, as shown in FIG. 2 and illustrated schematically the modulation inputs of FIG. 1.

Modulation of the high frequency pulses by a repeating curvilinear factor or function at low frequency is an alternative to the mere high and low heat states as set forth in FIG. 2. This modulation technique is set forth in FIG. 7 wherein modulator 100 is driven by a selected curve shown as curves 102, 104 and 106 as indicated in FIG. 1 or curves 272, 274 and 276 shown in FIG. 5. Modulation diagram 400 converts the selected low frequency undulating wave shape at modulator 100 into the desired pulse configuration to be outputted from modulated wave shaper 402. In the preferred embodiment, various features of the pulses 110 are specifically processed by networks 410, 412, 414, 416, 418, and 420. Each of these networks includes. multipliers 430, 432 and a summing junction 434. The particular aspect of the pulse being processed by the individual, networks 410, 412, 414, 416, 418, and 420 is loaded into register 436. The individual networks have gain inputs 440, 442, 444, 446, 448, and 450 as one input of the multiplier 430. The other input is line 100a–100f, respectively. The voltage level or digital number on lines 440, 442, 444, 446, 448, and 450 is the weight to cause a particular change in, a selected pulse feature. Network 410 has the peak current loaded into register 436. This is portion 110b of pulse 10. The peak time loaded into network 412 is time 110c shown in FIG. 2. Background current loaded into the register 436 of network 414 is current level 110e. The background time loaded into the register 436 of network 416 is the time from the end of ramp down 110d to the start of rampup 110a. The ramp up time is the time from the start of the pulse to the peak current. This is processed by network 418. Network 420 processes the ramp down time loaded into register 436 of this network. The networks illustrated in FIG. 7 are representative in nature. Indeed, other implementation of the modulation concept could be used with different pulse parameters. Pulses 110, as shown in FIG. 2, are processed as high heat pulses or as low heat pulses. This is the preferred implementation. However, these pulses can also be modulated by modulator diagram 400 shown in FIG. 7. An explanation of this diagram can be illustrated by reference to FIG. 8. In this figure, equally spaced high frequency pulses 500 are combined with alternating background current 502. This produces an alternation of high heat portion 504 with a low heat portion 506. These portions are undulating according to a sine wave configuration as selected by modulator 100. Using a sine wave input, the sine wave appears in all lines 100a–100f to the inputs of multiplier 430 in each network 410, 412, 414, 416, 418, and 420. To obtain the wave shape shown in FIG. 8, the input on all lines 440, 442, 444, 446, 448, and 450 which are the weight or gain lines, are zero except for line 444. The value of this input is a non-zero value. Consequently, the background current traces the sine wave on input line 100c. The remainder of the pulse functions remain fixed and are not altered. The peak current is unchanged. The peak time is the same. The background time is the same. The ramp up time and the ramp down time is the same for all pulses. Thus, the high and low heat areas are obtained merely by the modulation of the background current. Referring now to FIG. 9, the background current remains the same; therefore, the gain signal on input 444 is zero. In this particular graph, the peak time is changed in accordance with the sine wave function on line 100b. All inputs to the multiplier 430 of networks 410, 412, 414, 416, 418, and 420 are zero, except input 442. This produces an undulating modulated wave shape as shown in FIG. 9. Turning now to FIG. 10, the inputs to the initial multiplier 430 are zero, except for input 440 and input 444. The peak current is modulated and the background current is correspondingly modulated. To adjust the modulation, the magnitude of the voltage or number on input lines 440, 442, 444, 446, 448, and 450 is changed. By using FIG. 7, the pulse wave of FIG. 2 is modulated instead of being shifted from high to low heat portions. Other components and features of the pulses can be modulated. In FIG. 2, the pulses have a fixed frequency. If the ramp up time of network 48 were modulated according to the signal on line 100e, the frequency would change. The time of the pulses would vary. To maintain constant frequency, the modulation on input line 448 is coordinated with the modulation on line 450. One of these signals is positive and the other is negative. In this manner, the pulse period remains the same by increasing the ramp up time while decreasing the ramp down time. Other techniques for modulating the pulses 110 can be implemented by modulation diagram 400. Details of this particular modulation scheme are not intended to be limiting to the concept of a high frequency pulse wave modulated by a low frequency shift back and forth or undulation by a selected curve. The pulses in FIGS. 8–10 are pulses 500 and the background current is current 502 defining a high heat portion 504 and a low heat portion 506.

Figure 11:
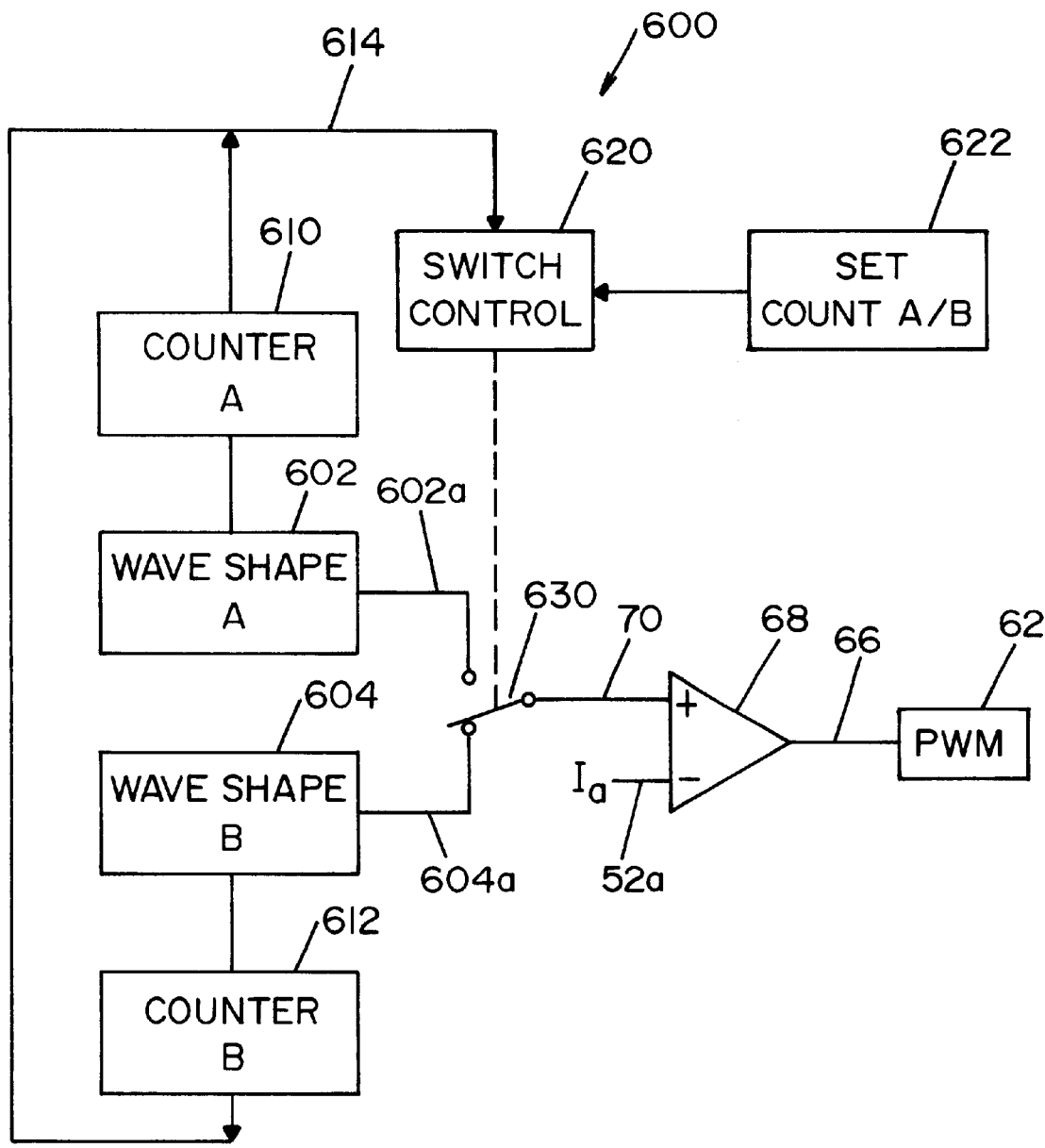

A further general implementation of the concepts of this invention are illustrated in FIG. 11 wherein system 600 controls the current command signal on line 70 for controlling the output shape of the weld process through error amplifier 68, as explained with respect to FIG. 1. System 600 has two wave shape forming digital processing sections 602, 604 corresponding generally to shape selectors or software 82a, 84a used with wave shaper 80 of FIG. 1. Wave shape A is processed when the output 602a is directed to command input line 70. In a like manner, the wave shape B is used to control the welding process when output line 604a of wave shaper section 604 is connected to the command signal line 70. As in FIG. 3, the pulses in wave shaper section 602 are counted by counter 610 and the pulses outputted from wave shaper section 604 are counted by counter 612. The counts are communicated by line 614 with switch control 620 having counts A and B set by input device 622. Switch control 620 shifts the electronic switch 630 between output lines 602a, 604a in accordance with the count numbers A and B set by device 622. These count numbers correspond generally to counts N1, N2 of FIG. 3. System 600, in some instances, is modified to count the total weld cycles of wave shape A or wave shape B, instead of the individual pulses as done by the control logic 90 in FIG. 3. Consequently, switch control 620 shifts from one process to the other process in accordance with the preselected count numbers input from device 622. System 600 therefore processes a high heat process when line 602a is the weld control line and a low heat process when the control line is line 604a. This is merely another version of shifting between high and low heat in a total welding process in accordance with the preselected modulation, in this instance the modulation is by the count numbers of either the pulses cycles from each of the wave shapes A and B.

Figure 8:
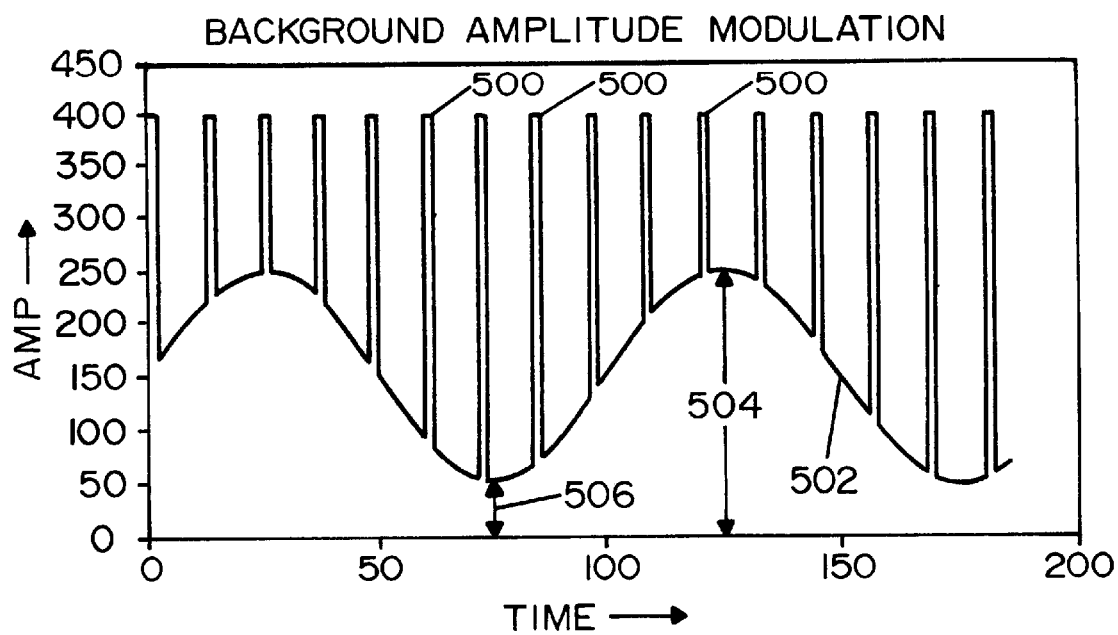
FIGS. 8–10 are current curves showing high frequency pulses modulated specifically by uses of the diagram and logic network of FIG. 7; and, FIG. 11 is a block diagram illustrating an implementation of a welding system and method contemplated by the present invention for shifting between two wave forms.
Figure 9:
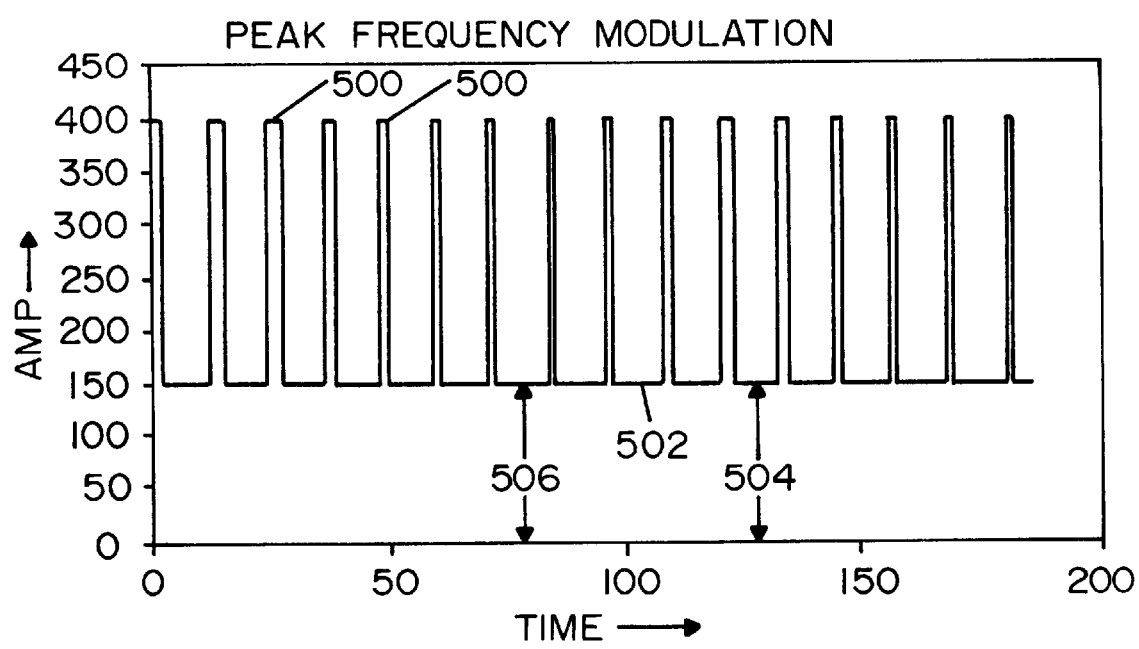
Figure 10:
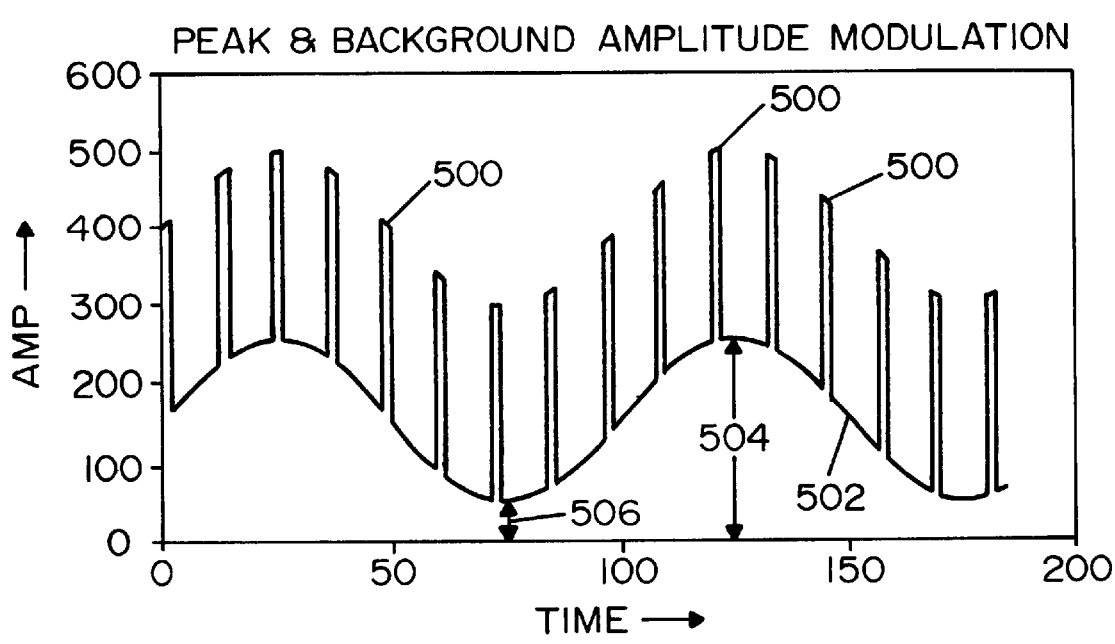

As shown in FIGS. 8–10, the average current remains the same during modulation as it was without any modulation.

The modulation merely adds to and subtracts from the current in a single cycle to thereby maintain the average current. Also, the high frequency of the pulse, when a fixed frequency (i.e. the pulse periods are not modulated) is an integer multiple of the low frequency used for modulation.

Having thus defined the invention, the following is claimed:

1. An electric arc welder including a high speed switching power supply with a controller for creating high frequency current pulses through the gap between a workpiece and a welding wire advancing toward said workpiece, said pulses defining with a background current a series of weld cycles, a wave shape generator to define the shape of said pulses and background current in each of said cycles, each pulse including at least a controlled ramp up or controlled ramp down and a circuit to form pulses of said cycles into a pattern of pulses and background current between a high energy portion and a low energy portion, said portions occurring at a low frequency, said high frequency of said pulses is substantially greater than said low frequency of said alternating portions of said cycles.

2. An electric arc welder as defined in claim 1 wherein said low, frequency is in the range of ¼ Hz to 40 Hz.

3. An electric arc welder as defined in claim 2 wherein said low frequency is less than 30 Hz.

4. An electric arc welder as defined in claim 3 wherein said high frequency is in the range of 50–400 Hz.

5. An electric arc welder as defined in claim 2 wherein said high frequency is in the range of 50–400 Hz.

6. An electric arc welder as defined in claim 5 wherein said high frequency pulses are equally spaced.

7. An electric arc welder as defined in claim 2 wherein said high speed switching of said power supply is at a frequency of at least 18 kHz.

8. An electric arc welder as defined in claim 2 including a wire feeder operated at a speed set by the value of a WFS signal and a circuit to shift said value of said WFS signal between a first value during said high energy portion and a second different value during said low energy portion.

9. An electric arc welder as defined in claim 2 wherein said high frequency pulses are equally spaced.

10. An electric arc welder as defined in claim 1 wherein said high frequency is in the range of 50–400 Hz.

11. An electric arc welder as defined in claim 10 wherein said high speed switching of said power supply is at a frequency of at least 18 kHz.

12. An electric arc welder as defined in claim 10 including a wire feeder operated at a speed set by the value of a WFTS signal and a circuit to shift said value of said WFS signal between a first value during said high energy portion and a second different value during said low energy portion.

13. An electric arc welder as defined in claim 1 wherein said low frequency is less than 30 Hz.

14. An electric arc welder as defined in claim 13 wherein said high speed switching of said power supply is at a frequency of at least 18 kHz.

15. An electric arc welder as defined in claim 13 including a wire feeder operated at a speed set by the value of a WFS signal and a circuit to shift said value of said WFS signal between a first value during said high energy portion and a second different value during said low energy portion.

16. An electric arc welder as defined in claim 1 wherein said high speed switching of said power supply is at a frequency of at least 18 kHz.

17. An electric arc welder as defined in claim 1 wherein each of said pulses includes a peak current, a ramp up leading edge with a given slope and a ramp down with a given slope.

18. An electric arc welder as defined in claim 17 wherein said given slope of said ramp up of a pulse in said high energy portion of said cycle is substantially greater than said given slope of said ramp up of a pulse in said low energy portion of said cycle.

19. An electric arc welder as defined in claim 18 wherein said give slope of said ramp down of a pulse in said high energy portion of said cycle is substantially less than said given slope of said ramp down in said low energy portion of said cycle.

20. An electric arc welder as defined in claim 17 wherein said give slope of said ramp down of a pulse in said high energy portion of said cycle is substantially less than said given slope of said ramp down in said low energy portion of said cycle.

21. An electric arc welder as defined in claim 1 including a counter for counting said pulses in said energy portions and a circuit to shift between energy portions when the count of the energy portion being processed reaches a preselected number for such portion.

22. An electric arc welder as defined in claim 21 wherein said preselected number is the same for each of said energy portions.

23. An electric arc welder as defined in claim 22 including a sensor creating a voltage representing the arc length at said gap and a circuit for changing said preselected number of at least one of said energy portions in accordance with said voltage.

24. An electric arc welder as defined in claim 22 including a sensor creating a voltage representing the arc length at said gap and a circuit for changing said preselected number of at least one of said energy portions in accordance with said voltage.

25. An electric arc welder as defined in claim 21 including a weld start sequence and a circuit for gradually increasing said preselected number for said high energy portion during said weld.

26. An electric arc welder as defined in claim 21 including a weld start sequence and a circuit for gradually increasing said preselected number for said high energy portion during said weld.

27. An electric arc welder as defined in claim 21 including a wire feeder operated at a speed set by the value of a WFS signal and a circuit to shift said value of said WFS signal between a first value during said high energy portion and a second different value during said low energy portion.

28. An electric arc welder as defined in claim 27 including a sensor creating a voltage representing the arc length at said gap and a circuit for changing said preselected number of at least one of said energy portions in accordance with said voltage.

29. An electric arc welder as defined in claim 1 including a wire feeder operated at a speed set by the value of a WVS signal and a circuit to shift said value of said WFS signal between a first value during said high energy portion and a second different value during said low energy portion.

30. An electric arc welder as defined in claim 29 wherein said first value is greater than said second value.

31. An electric arc welder as defined in claim 1 wherein said high frequency pulses are equally spaced.

32. An electric arc welder as defined in claim 1 including a sensor to create a signal representing arc length and a circuit to change one or both of said portions to maintain said arc length near a given value.

33. A method of operating an electric arc welder including a high speed switching power supply with a controller for creating high frequency current pulses through the gap between a workpiece and a welding wire advancing toward said workpiece, said pulses defining with a background current a series of weld cycles, said method comprising:
(a) shaping of said pulses and background current in each of said cycles by at least controlling the ramp up or the ramp down of said pulses; and,
(b) forming pulses of said cycle into a pattern of pulses and background current between a high energy portion and a low energy portion, said portions occurring at a low frequency, said high frequency of said pulses is substantially greater than said low frequency of said alternating portions of said cycles.

34. A method as defined in claim 33 wherein said low frequency is in the range of ¼ Hz to 40 Hz.

35. A method as defined in claim 34 wherein said low frequency is less than 30 Hz.

36. A method as defined in claim 35 wherein said high frequency is in the range of 50–400 Hz.

37. An electric arc welder as defined in claim 33 wherein said high speed switching of said power supply is at a frequency of at least 18 kHz.

38. A method as defined in claim 33 wherein each of said pulses includes a peak current, a ramp up leading edge with a given slope and a ramp down with a given slope.

39. A method as defined in claim 38 wherein said given slope of said ramp up of a pulse in said high energy portion of said cycle is substantially greater than said given slope of said ramp up of a pulse in said low energy portion of said cycle.

40. A method as defined in claim 38 wherein said given slope of said ramp down of a pulse in said high energy portion of said cycle is substantially less than said given slope of said ramp down in said low energy portion of said cycle.

41. A method as defined in claim 33 including the acts of:
(c) counting said pulses in one of said energy portions; and,
(d) shifting to said other energy portion when said count reaches a preselected number.

42. A method as defined in claim 41 wherein said preselected number is the same for each of said energy portions.

43. A method as defined in claim 41 including:
(e) creating a voltage representing the arc length at said gap; and,
(f) changing aid preselected number of at least one of said energy portions in accordance with said voltage.

44. A method as defined in claim 41 including:
(g) gradually decreasing said preselected number for said high energy portion during said weld.

45. A method as defined in claim 33 wherein said pulses are equally spaced.

46. A method as defined in claim 33 including:
(c) creating a signal representing arc length; and,
(d) changing one or both of said portions in response to said signal.

47. An electric arc welder including a high speed switching power supply with a controller for creating high frequency current pulses through the gap between a workpiece and a welding wire advancing toward said workpiece, said pulses and a background current defining a series of weld cycles, a wave shape generator to define the shape of said pulses and the background current in each of said cycles, each pulse including at least a controlled ramp up or a controlled ramp down, and a circuit to change said shapes of said pulses or said background current in a repeating modulated pattern in each of said weld cycles, said repeating pattern occurring at a low frequency and is an AC signal with a general zero average.

48. An electric arc welder as defined in claim 47 wherein said defined shape of each pulse includes one or more shape aspect selected from the group consisting of peak current, peak time, ramp up time, ramp up rate, ramp down rate, and ramp down time.

49. An electric arc welder as defined in claim 48 wherein said repeating pattern is determined by a variable value multiplied by a current feature comprising at least one or more of said shape aspect or said background current.

50. An electric arc welder as defined in claim 49 wherein said value is selected from the group consisting of a sine curve with a low frequency, an alternating generally square curve with a low frequency, a saw tooth curve with a frequency and an alternating curvilinear curve with a low frequency, said low frequency being less than 30 Hz.

51. An electric arc welder as defined in claim 50 wherein said current feature is background current.

52. An electric arc welder as defined in claim 50 wherein said current feature is ramp up time.

53. An electric arc welder as defined in claim 50 wherein said current feature is ramp down time.

54. An electric arc welder as defined in claim 50 wherein said current feature is ramp up rate.

55. An electric arc welder as defined in claim 50 wherein said current feature is ramp down rate.

56. An electric arc welder as defined in claim 50 wherein said current feature is peak current.

57. An electric arc welder as defined in claim 50 wherein said current feature is peak time.

58. An electric arc welder as defined in claim 50 wherein current pulses have a frequency in the range of 50–400 Hz.

59. An electric arc welder as defined in claim 50 wherein said high frequency pulses are equally spaced and said high frequency is an integer multiple of said low frequency.

60. An electric arc welder as defined in claim 49 wherein said current feature is background current.

61. An electric arc welder as defined in claim 49 wherein said current feature is ramp up time.

62. An electric arc welder as defined in claim 49 wherein said current feature is ramp down time.

63. An electric arc welder as defined in claim 49 wherein said current feature is ramp up rate.

64. An electric arc welder as defined in claim 49 wherein said current feature is ramp down rate.

65. An electric arc welder as defined in claim 49 wherein said current feature is peak current.

66. An electric arc welder as defined in claim 49 wherein said current feature is peak time.

67. An electric arc welder as defined in claim 49 wherein current pulses have a frequency in the range of 50–400 Hz.

68. An electric arc welder as defined in claim 49 wherein said high frequency pulses are equally spaced and said high frequency is an integer multiple of said low frequency.

69. An electric arc welder as defined in claim 48 wherein said current feature is background current.

70. An electric arc welder as defined in claim 48 wherein said current feature is ramp up time.

71. An electric arc welder as defined in claim 48 wherein said current feature is ramp down time.

72. An electric arc welder as defined in claim 48 wherein said current feature is ramp up rate.

73. An electric arc welder as defined in claim 48 wherein said current feature is ramp down rate.

74. An electric arc welder as defined in claim 48 wherein said current feature is peak current.

75. An electric arc welder as defined in claim 74 wherein current pulses have a frequency in the range of 50–400 Hz.

76. An electric arc welder as defined in claim 48 wherein said current feature is peak time.

77. An electric arc welder as defined in claim 76 wherein current pulses have a frequency in the range of 50–400 Hz.

78. An electric arc welder as defined in claim 48 wherein current pulses have a frequency in the range of 50–400 Hz.

79. An electric arc welder as defined in claim 48 wherein said high frequency pulses are equally spaced and said high frequency is an integer multiple of said low frequency.

80. An electric arc welder as defined in claim 47 wherein said high frequency pulses are equally spaced and said high frequency is an integer multiple of said low frequency.

81. An electric arc GMAW welder including a high speed switching power supply with a controller for creating a weld process including high frequency current pulses through the gap between a workpiece and a welding wire advancing toward said workpiece, said pulses defining a series of weld cycles and a wire feeder operated at a speed set by the value of a WFS signal, a circuit to form said cycle into a pattern of pulses between a high energy portion and a low energy portion, said portions occurring at a low frequency, said high frequency of said pulses is substantially greater than said low frequency of said portions, and a synergistic database to shift said value of said WFS signal between a first value during said high energy portion and a second different value during said low energy portion.

82. An electric arc welder as defined in claim 81 wherein said first value is greater than said second value.

83. An electric arc welder including a high speed switching power supply with a controller for creating a weld process including high frequency current pulses through the gap between a workpiece and a welding wire advancing toward said workpiece and a wire feeder operated at a speed set by the value of a WPS signal, said pulses and a background current defining a series of weld cycles, a circuit to change said weld cycle in a repeating pattern, and a circuit to change said value of said WFS signal in unison with said repeating pattern.

84. An electric arc welder as defined in claim 83 wherein said pattern is selected from the group consisting of a sine curve with a low frequency, an alternating generally square curve with a low frequency, a saw tooth curve with a low frequency and an alternating curvilinear curve with a low frequency, said low frequency being less than 50 Hz and said high frequency of said pulses is substantially greater than said low frequency of said pattern.

85. An electric arc welder as defined in claim 84 wherein said low frequency is in the range of ¼ Hz to 40 Hz.

86. An electric arc welder as defined in claim 84 wherein said low frequency is less than 30 Hz.

87. An electric arc welder as defined in claim 84 wherein said high frequency is in the range of 50–400 Hz.

88. An electric arc welder as defined in claim 84 wherein said high speed switching of said power supply is at a frequency of at least 18 kHz.

89. An electric arc GMAW welder including a high speed switching power supply with a controller for creating a first or second weld process across the gap between a workpiece and a welding wire advanced toward said workpiece by a wire feeder driven at a speed set by the level of a WFS signal, said first process using a first current waveform and a first level for said WFS signal, said second process using a second current waveform and a second level for said WFS signal, and a circuit for alternating between said first and second weld processes at a low frequency, said circuit including a counter for counting said waveforms in said first and second processes and a circuit to shift from the process being processed to the other weld process when said waveform count of said weld process being processed reaches a preselected number for such weld process.

90. An electric arc welder as defined in claim 89 wherein said preselected number is the same for each of said first and second weld processes.

91. A method for operating a GMAW electric arc welder including a high speed switching power supply with a controller for creating a weld process including high frequency current pulses through the gap between a workpiece and a welding wire advancing toward said workpiece, said pulses defining a series of weld cycles, and a wire feeder operated at a speed set by the value of a WFS signal, said method comprising:
  (a) forming said cycle into a pattern of pulses between a high energy portion and low energy portion, said portions occurring at a low frequency, said high frequency of said pulses being substantially greater than said low frequency of said portions; and,
  (b) shifting said value of said WFS signal between a first value during said high energy portion and a second different value during said low energy portion based upon a synergistic database.

92. A method as defined in claim 91 wherein said first value is greater than said second value.

93. A method of operating a GMAW electric arc welder including a high speed switching power supply with a controller for creating a weld process including high frequency, current pulses through the gap between said workpiece and a welding wire advancing toward said workpiece, said: pulses defining a series of weld cycles, and a wire feeder operated at a speed set by the value of a WFS signal, said method comprising:
  (a) forming said cycle into a pattern of pulses between a high energy portion and low energy portion, said portions occurring at a low frequency, said high frequency of said pulses being substantially greater than said low frequency of said portions; and,
  (b) shifting said value of said WFS signal between a first value during said high energy portion and a second different value during said low energy portion based upon a synergistic database.

94. An electric arc welder as defined in claim 93 wherein said first value is greater than said second value.

95. A method of operating a GMAW electric arc welder including a high speed switching power supply with a controller for creating a weld process including high frequency current pulses through the gap between a workpiece and a welding wire advancing toward said workpiece and a wire feeder operated at a speed set by the value of a WFS signal, said pulses and a background current defining a series of weld cycles, said method comprising:
  (a) changing said weld cycle in a repeating pattern; and,
  (b) changing said value of said WFS signal in unison with said repeating pattern.

96. A method as defined in claim 95 wherein said pattern is selected from the group consisting of a sine curve with a low frequency, an alternating generally square curve with a low frequency, a saw tooth curve with a low frequency and an alternating curvilinear curve with a low frequency, said low frequency being less than 50 Hz and said high frequency of said pulses being substantially greater than said low frequency of said pattern.

97. A method of operating an electric arc welder including a high speed switching power supply with a controller for creating a high synergistic output and a low synergistic output across the gap between a workpiece and a welding wire advanced toward said workpiece by a wire feed driven at a speed set by the level of a WFS signal, said method comprising:

(a) using a first current waveform with a plurality of high frequency pulses and a first level for said WFS signal in said high synergistic output;

(b) using a second current waveform with a plurality of high frequency pulses and a second level for said WFS signal for said low synergistic output; and, (c) alternating between said high and low synergistic outputs at a low frequency, said high frequency of said pulses being substantially greater than said low frequency.

98. A method as defined in claim 97 further including:

(d) counting said pulses in said high and low synergistic outputs; and, (e) shifting said outputs when said pulse count of said created output reaches a preselected number for such output.

99. A method as defined in claim 98 wherein said preselected number is the same for each of said high and low outputs.

100. A method as defined in claim 97 wherein said high output has a substantially greater heat than said low output.

101. An electric arc welder including a high speed switching power supply with a controller for creating high frequency current pulses through the gap between a workpiece and a welding wire advancing toward said workpiece, a wave shape generator to define the shape of said pulses, said shape including background current, said shape having several features, at least one of which remains at a fixed current, modulating at least one feature of said shape at a low frequency substantially lower than said high frequency, a sensor for creating a voltage representing the arc length of said gap during fixed current feature of said current pulse shape, and a circuit for changing one of said current pulse shape features in accordance with the relationship of said sensed voltage and an arc length reference voltage.

102. A welder as defined in claim 101 wherein said fixed current feature is the peak current of said pulse shape.

103. A welder as defined in claim 102 wherein said changed pulse shape feature is peak current.

104. A welder as defined in claim 102 wherein said changed pulse shape feature is peak time.

105. A welder as defined in claim 101 wherein said fixed current feature is the background current of said pulse shape.

106. A welder as defined in claim 105 wherein said changed pulse shape feature is peak current.

107. A welder as defined in claim 105 wherein said changed pulse shape feature is peak time.

108. A welder as defined in claim 101 wherein said changed pulse shape feature is peak current.

109. A welder as defined in claim 101 wherein said changed pulse shape feature is peak time.

* * * * *